United States Patent [19]
Johnson

[11] Patent Number: 6,040,980
[45] Date of Patent: Mar. 21, 2000

[54] DISK DRIVE TO CHASSIS MOUNTING APPARATUS AND METHOD

[75] Inventor: Greg P. Johnson, Boise, Id.

[73] Assignee: Micron Electronics, Inc., Nampa, Id.

[21] Appl. No.: 09/177,698

[22] Filed: Oct. 21, 1998

[51] Int. Cl.[7] .............................. H05K 5/00; H05K 7/00
[52] U.S. Cl. ...................... 361/685; 361/728; 361/747; 361/725; 312/333
[58] Field of Search .................... 361/685, 686, 361/684, 724, 725, 728, 747; 312/332.1, 333, 223.2, 223.1, 251.1; 248/240, 291.1, 225.11

[56] References Cited

U.S. PATENT DOCUMENTS

| | | | |
|---|---|---|---|
| 5,136,466 | 8/1992 | Remise et al. | 361/391 |
| 5,216,582 | 6/1993 | Russell et al. | 361/395 |
| 5,332,306 | 7/1994 | Babbi et al. | 312/334.16 |
| 5,355,267 | 10/1994 | Aoyagi et al. | 360/104 |
| 5,488,538 | 1/1996 | Wakita | 361/685 |
| 5,564,804 | 10/1996 | Gonzalez et al. | 312/223.2 |
| 5,595,501 | 1/1997 | Ho | 439/377 |
| 5,680,293 | 10/1997 | McAnally et al. | 361/685 |
| 5,682,291 | 10/1997 | Jeffries et al. | 361/1.85 |
| 5,784,251 | 7/1998 | Miller et al. | 361/683 |
| 5,790,373 | 8/1998 | Kim et al. | 361/685 |
| 5,808,864 | 9/1998 | Jung | 361/685 |

*Primary Examiner*—Leo P. Picard
*Assistant Examiner*—Anatoly Vortman
*Attorney, Agent, or Firm*—Paul A. Revis

[57] ABSTRACT

An apparatus and method for mounting a disk drive such as a hard drive, floppy drive, or CD-ROM drive to the chassis of a computer. No tools or conventional fasteners such as screws are required to install or remove a disk drive. A combination of members, including shear connectors and a deformable member, are employed to secure a disk drive.

30 Claims, 9 Drawing Sheets

DISK DRIVE TO CHASSIS MOUNTING APPARATUS AND METHOD

TECHNICAL FIELD

The present invention is directed toward an apparatus and method of mounting a computer component such as a hard drive to a chassis of a computer.

BACKGROUND OF THE INVENTION

A conventional mounting device for a disk drive such as a hard disk drive, floppy disk drive, or CD-ROM drive in a computer chassis includes a bracket. The bracket provides a means of connection to the disk drive as well as to the chassis. A typical arrangement is to employ screws to connect a drive to the bracket. The bracket is in turn connected to the chassis by screws, mounting rails, hinges, or the like. The primary disadvantage of such conventional devices is that screws must be used, either directly or through the bracket, to connect the disk drive to the chassis. Insertion and removal of screws is time consuming and cumbersome due to the work space restriction and accessibility limitations existing within a typical chassis.

In a more modem arrangement, portions of a bracket are inserted into one or more of the threaded holes of the disk drive to secure the disk drive. An example of such an arrangement is disclosed in U.S. Pat. No. 5,680,293. In that patent, a first, detachable bracket is inserted into one section of a second bracket that is connected to the computer chassis. The detachable bracket locks into another part of the second bracket which is connected to the computer chassis. Additionally, the bracket is inserted into the threaded holes of a disk drive to secure the disk drive. The drawbacks of such an arrangement are that multiple brackets are used and that one of the brackets is detachable. Multiple brackets require greater resources to manufacture and implement. Also, because one of the brackets is detachable, it can become separated from the other bracket parts during manufacture or maintenance. To add additional security to the arrangement of the '293 patent, a supplemental tab on the computer case cover is provided. The tab engages the hook that releases the second bracket when the cover is secured in place. Consequently, there must be careful coordination between the cover and the hook in manufacturing and mounting the respective parts.

There is a need for an apparatus and method that simplifies the connection of disk drives to a chassis. An acceptable apparatus would provide for quick and efficient engagement and disengagement of disk drives during manufacture and maintenance. To enhance the ease of operation of the apparatus, no screws or tools should be required to add or remove a disk drive. An apparatus is needed that reduces the number of parts that are required to connect a disk drive to a chassis. The apparatus should also secure disk drives to prevent disengagement of disk drives without the need for close manufacturing tolerances.

SUMMARY OF THE INVENTION

The present invention is directed toward an apparatus for mounting of disk drives such as hard drives, floppy disk drives, and CD-ROM drives. In one embodiment, the disk drive has a first side, a second side, a third side, and a fourth side. The first side is opposite the third side and the second side is opposite the fourth side. The first side has a first hole and the second side has a second hole. This embodiment includes: a first member having a first shear connector for engaging the first hole; a second member, coupled to said first member; and a deformable member, coupled to said second member, for engaging the third and fourth sides of the disk drive.

Another embodiment includes: a first member for engaging the first and fourth sides of the disk drive; a second member, coupled to said first member; and a deformable member, coupled to said second member, for engaging the third and fourth sides of the disk drive.

In yet another embodiment, the invention is a computer system having an apparatus for mounting a disk drive, the disk drive having a first side, a second side, a third side, and a fourth side, the first side being opposite the third side and the second side being opposite the fourth side, the first side having a first hole and the second side having a second hole. The system comprises: a chassis; a power supply coupled to said chassis; a central processing unit coupled to said chassis and electrically connected to said power supply; and a disk drive electrically connected to said central processing unit having an apparatus for mounting a disk drive to said chassis. The disk drive comprises: a first member for engaging the first side of the disk drive, a second member, coupled to said first member, and a deformable member, coupled to said second member, for engaging the third and fourth sides of the disk drive.

In another embodiment the invention is a method of installing a disk drive comprising the acts of: positioning at least a portion of a first side of the disk drive onto a first member of an apparatus for mounting a disk drive; rotating the disk drive toward the apparatus about a point near the first member; and displacing a deformable member with a portion of the disk drive until the disk drive is captured within the deformable member and within the apparatus.

DETAILED DESCRIPTION OF THE INVENTION

Embodiments of the present invention are directed toward an apparatus for mounting a disk drive on a computer chassis.

Disk Drive

Figure 1:
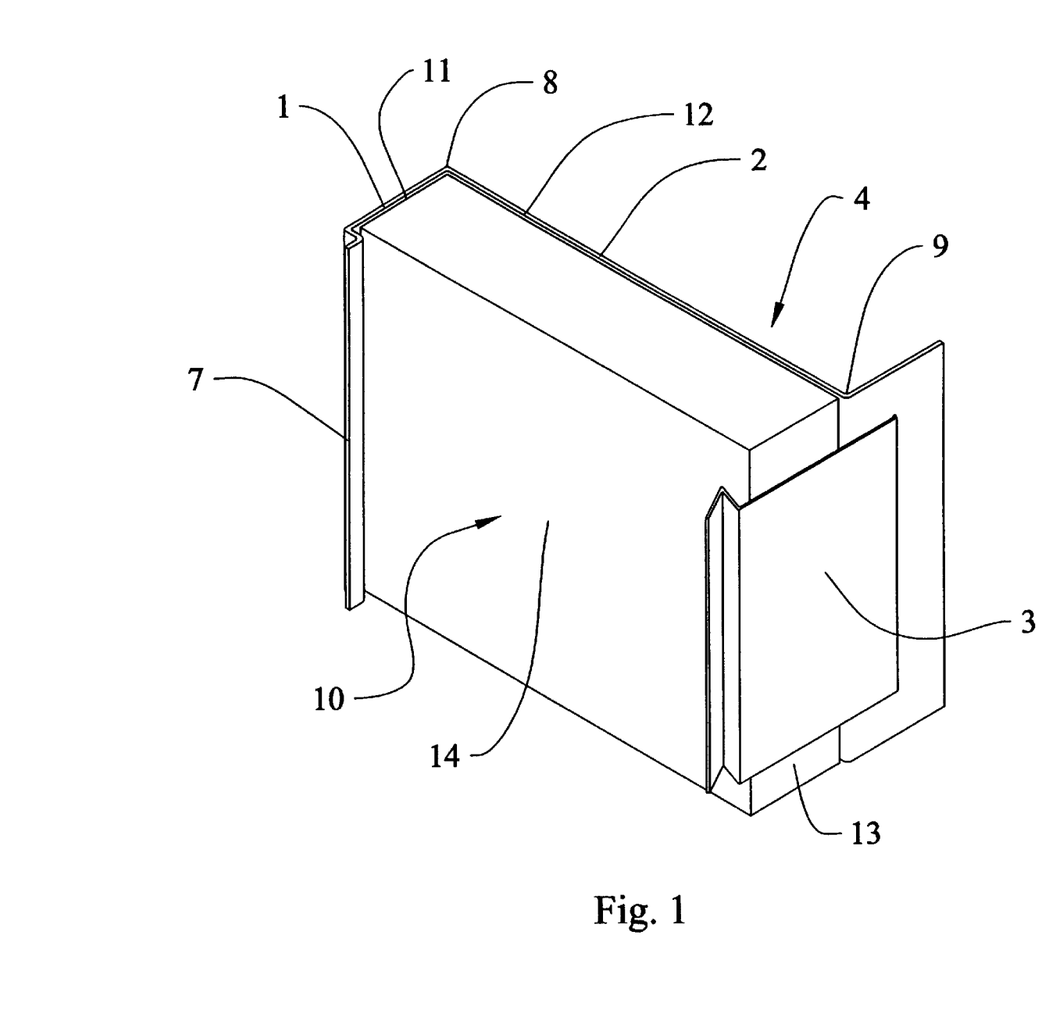
FIG. 1 is a top perspective view of an embodiment of the apparatus with a mounted disk drive.
Figure 2:
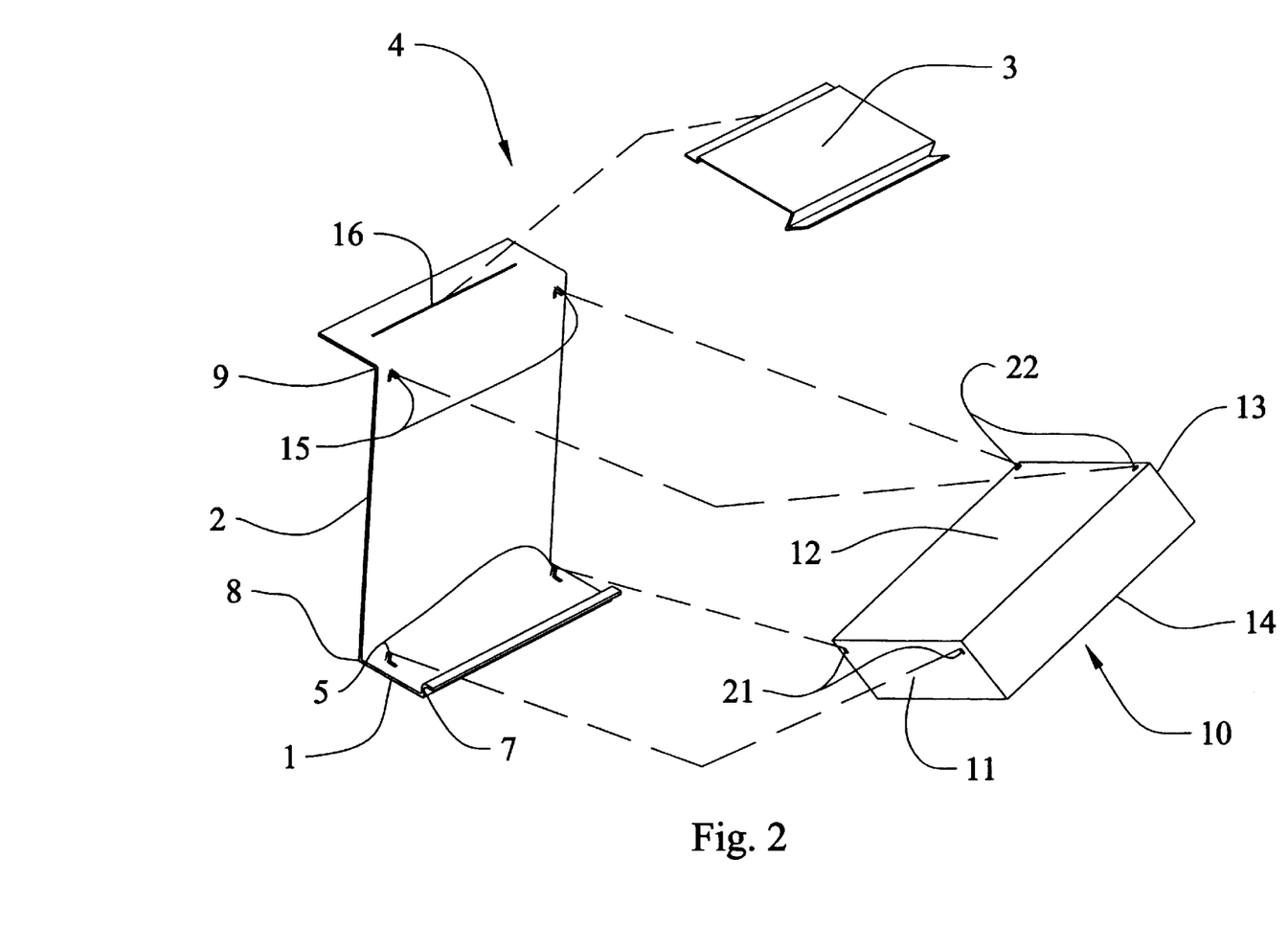
FIG. 2 is a top, exploded perspective view of an embodiment of the apparatus and a disk drive.

FIG. 1 shows a disk drive 10 engaged in an apparatus for mounting a disk drive 4. The disk drive 10 may be a hard disk drive, a floppy disk drive, a CD-ROM disk drive or any other related type of drive. As shown in FIGS. 1 and 2, a typical disk drive has an elongated generally cubical outer dimension. A first side 11, a second side 12, a third side 13, and a fourth side 14 may be engaged to secure a disk drive 10 in the apparatus 4. The first side 11 is opposite the third side 13 and the second side 12 is opposite the fourth side 14.

A conventional disk drive has standardized threaded holes in the sides of the disk drive for receiving threaded fasteners such as screws. FIG. 2 shows a pair of first holes 21 in the first side 11, and a pair of second holes 22 in the second side 12. Although a conventional disk drive employs threaded holes, the apparatus would work equally well with non-threaded holes or slots.

Apparatus For Mounting a Disk Drive

The apparatus for mounting a disk drive 4 is composed of a first member 1, a second member 2, and a deformable member 3. The second member 2 is coupled to both the first member 1 and the deformable member 3. The invention contemplates various couplings among the members and various configurations for the members. A first embodiment associated with FIGS. 1 and 2 is described immediately below. Other embodiments with various couplings and configurations are described in the sections that follow.

Description of a First Embodiment

First Member

As shown in FIG. 2, one embodiment of the first member 1 has a first shear connector 5 for engaging a first hole 21 in the disk drive 10. The embodiment uses a pair of first shear connectors 5 to engage a pair of first holes 21. A first shear connector 5 can be formed by any means of attaching or arranging a portion of material to create an element that will resist force applied along the plane defined by the first member 1. As an example, FIG. 2 shows first shear connectors 5 created by deforming a portion of the material of the first member 1 to form appendages extending substantially perpendicular to the first member 1.

The first member 1 engages the first side 11 and the fourth side 14 of the disk drive 10. The majority of the first member 1 engages the first side 11 of the disk drive 10, and a tab 7 which is part of the first member 1 engages the fourth side 14 of the disk drive 10.

Second Member

The second member 2 is coupled to the first member 1 along a common edge 8. The coupling can be by any adequate means such as welding, applying adhesive, riveting, screwing, or in some embodiments, the first and second members can be formed from a single piece of material. As illustrated in FIGS. 1 and 2, the second member 2 has a bend 9 so that the second member 2 is approximately "L" shaped in cross section. When the second member 2 is formed from a single piece with the first member 1, an approximate "S" shaped cross section is created. The approximate "S" shape is formed by two components extending approximately perpendicularly from opposite ends of a middle component, where the two end components extend in opposite directions from one another.

As shown in FIG. 2, the second member 2 may have one or more second shear connectors 15. A pair of second shear connectors 15 for engaging a pair of second holes 22 in the second side 12 of disk drive 10 is shown. As with the first shear connectors 5, the second shear connectors 15 may be formed by deforming a portion of material from the second member 2 to form an appendage extending substantially perpendicular to the second member 2.

The tab 7 and the shear connectors 5 and 15 are used in combination to provide engagement with the disk drive 10 as shown in FIG. 2. Other effective combinations of the tab 7 and the shear connectors 5 and 15 are described below.

In an embodiment of the invention, the second member 2 has a slot 16 for accepting a portion of a deformable member 3.

Deformable Member

As shown in FIGS. 1 and 2, the deformable member 3 is coupled to the second member 2 and engages the third side 13 and the fourth side 14 of the disk drive 10. In one embodiment, the deformable member 3 is made of a flexible material such as spring steel. The coupling can be by any adequate means such as welding, applying adhesive, riveting, or screwing. In the embodiment shown in FIGS. 1 and 2, the deformable member 3 is inserted into the slot 16 in a portion of the second member 2 that is perpendicular to the second side 12 of the disk drive 10 when the disk drive 10 is installed. In some embodiments, the deformable member 3 is free to rotate in the slot 16 and the deformable member 3 is held in contact with the disk drive 10 by a chassis cover 25 as shown in FIG. 8e. In other embodiments, the deformable member 3 can be held in the slot 16 as well as fastened to the second member 2 by conventional means such as welding, applying adhesive, riveting, or screwing. In this particular embodiment, the deformable member 3 is deformed as shown in FIGS. 8a–e in order to engage the disk drive 10 with the apparatus 4.

Method of Operating the First Embodiment of the Invention

Figure 8A:
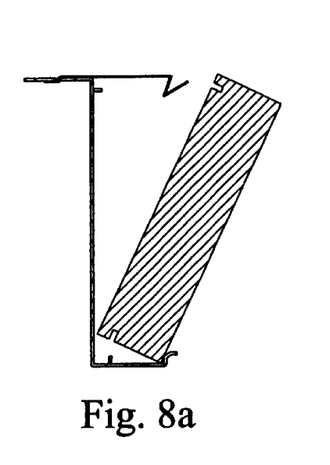
FIGS. 8a–e show a progression of cross section views illustrating the insertion of a disk drive into an embodiment of the apparatus.
Figure 8B:
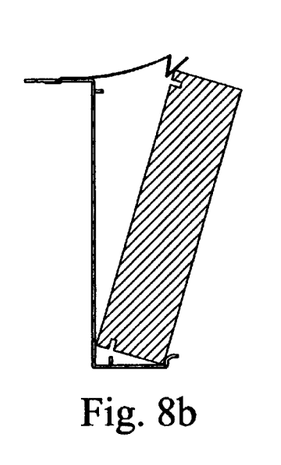
Figure 8C:
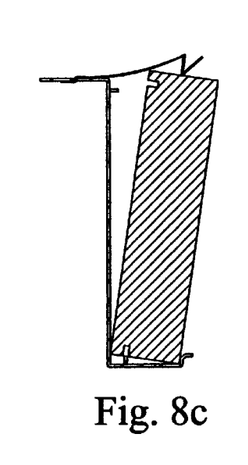
Figure 8D:
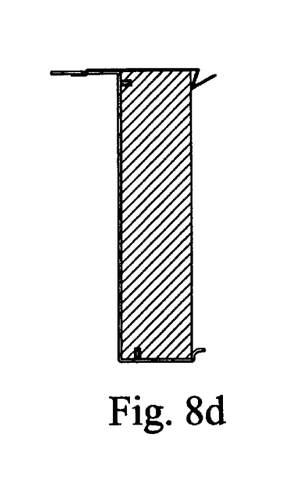
Figure 8E:
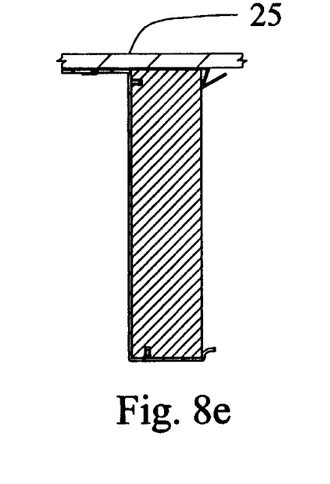

FIGS. 8a–e illustrate a method of installing a disk drive. As shown in FIG. 8a, first at least a portion of a first side of the disk drive is positioned onto a first member of the apparatus for mounting a disk drive. As illustrated, the portion of the disk drive positioned may be a corner of the disk drive formed in part by the first side of the disk drive.

An end of the disk drive opposite from the first side of the disk drive is then rotated toward the apparatus about a point near the first member. The rotation is illustrated by the difference between the positions shown in FIGS. 8a and 8b. The rotation as illustrated is a rotation about a corner of the disk drive that is formed in part by the first side of the disk drive.

The rotation is continued as shown by FIGS. 8c and 8d and the deformable member is displaced by a portion of the disk drive until the disk drive is captured within the deformable member and within the apparatus. Where the deformable member is free to rotate in the slot as described in the section immediately above, the deformable member rotates about the slot rather than deforming as shown in FIGS. 8b and 8c.

The method may also include the act of placing a chassis cover 25 on the chassis as shown in FIG. 8e. The cover abuts with a portion of the apparatus for mounting a disk drive to prevent the disk drive from dislodging from the apparatus.

Description of Other Embodiments

First Member

Figure 3:
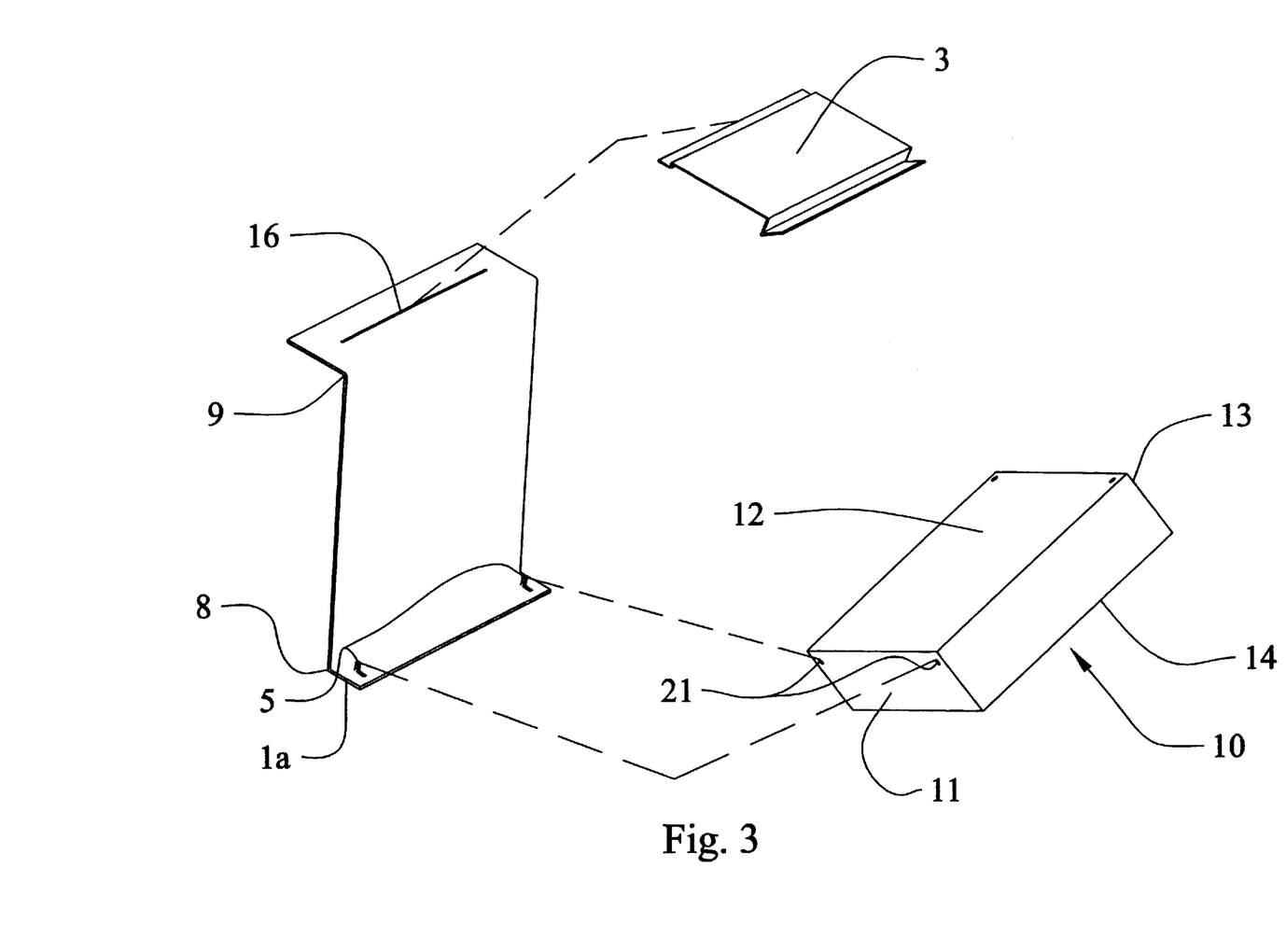
FIG. 3 is a top, exploded perspective view of an embodiment of the apparatus and a disk drive.
Figure 4:
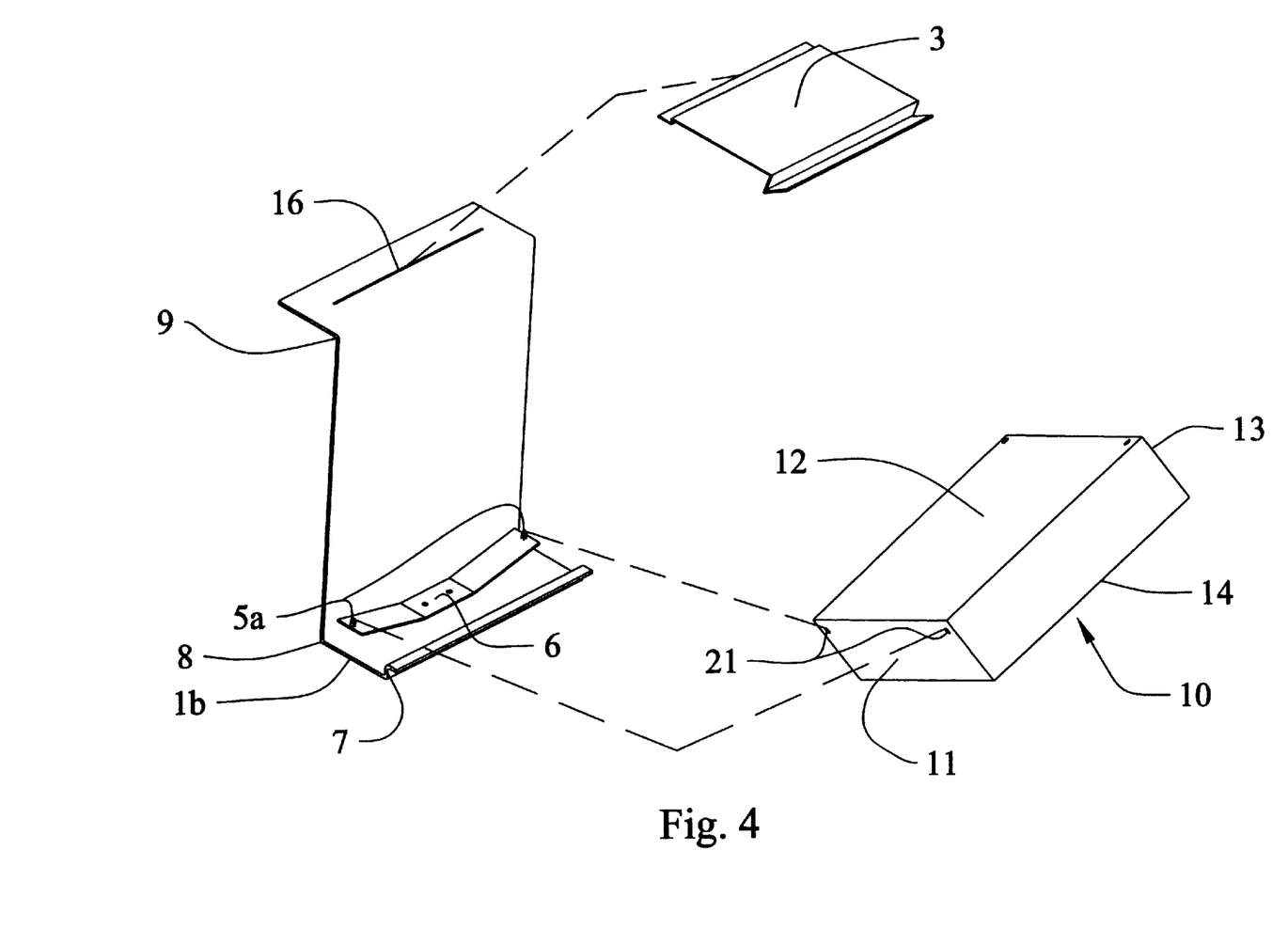
FIG. 4 is a top, exploded perspective view of an embodiment of the apparatus with a leaf spring with shear connectors and a disk drive.

FIG. 3 shows an alternate first member 1a that does not have the tab 7 of first member 1. Alternate first member 1a does have shear connectors 5. In another embodiment as shown in FIG. 4, a pair of shear connectors 5a is attached to a leaf spring 6 that is part of a modified first member 1b. The modified first member 1b and a substitute first member 1c, as shown in FIG. 5, each use a tab 7 to engage the first side 11 and the fourth side 14 of the disk drive 10.

In the embodiments shown in FIG. 4, leaf spring 6 is a part of the modified first members 1b. The leaf spring is compressed when the disk drive 10 is inserted into the apparatus for mounting the disk drive. Similarly, in the embodiment shown in FIG. 5, alternate leaf spring 6a is a part of the substitute first member 1c. The leaf springs each bias a disk drive 10 away from their respective first members. In FIG. 4, alternate shear connectors 5a are attached to the leaf spring 6 so that the modified first member 1b provides shear resistance as well as bias.

Second Member

Figure 5:
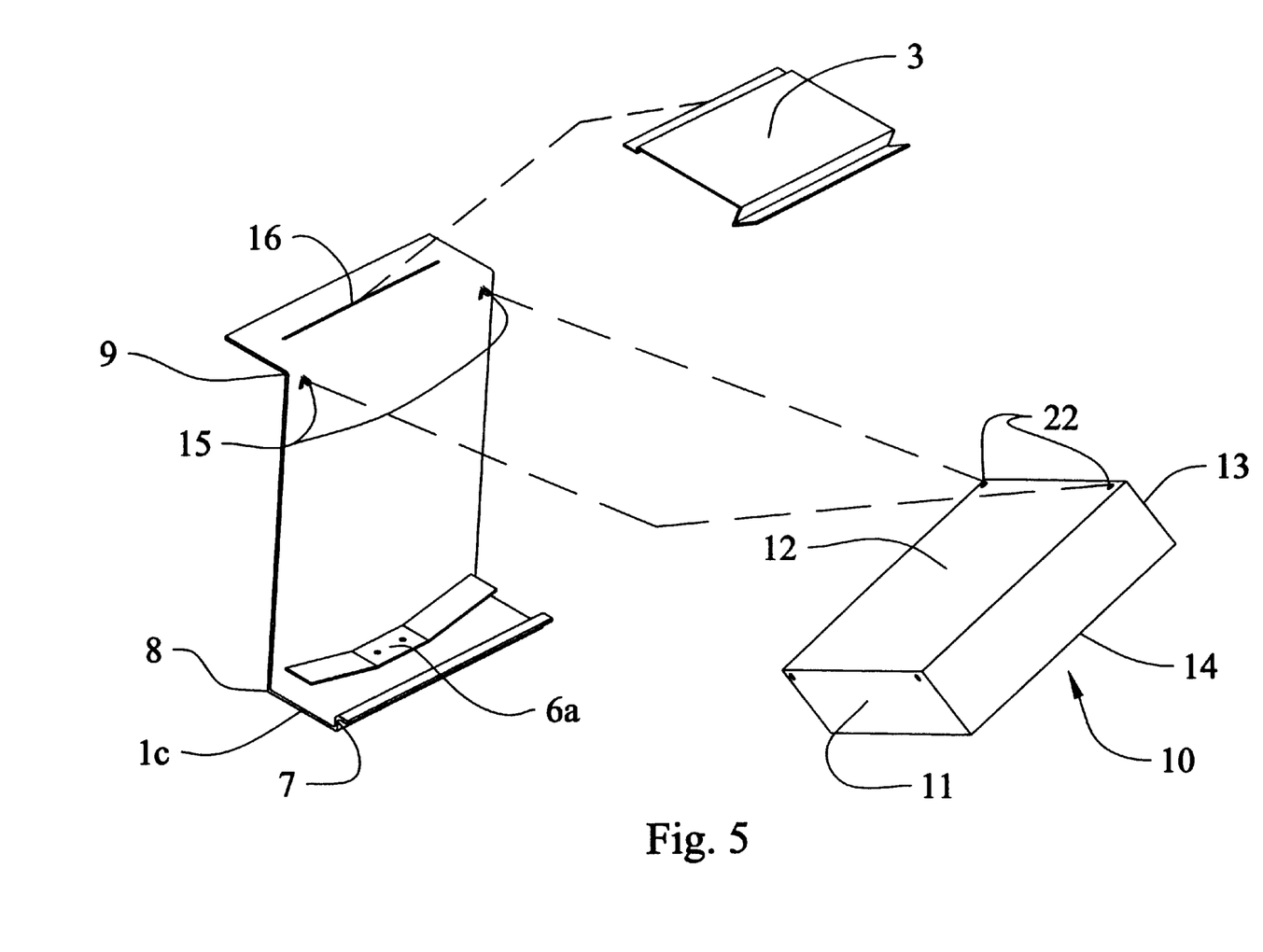
FIG. 5 is a top, exploded perspective view of an embodiment of the apparatus with a leaf spring and a disk drive.

The second member shown in FIGS. 3–5 is very similar to the second member 2 of the first embodiment. As with the first embodiment, the embodiment shown in FIG. 5 employs a second shear connector 15. A pair of second shear connectors 15 for engaging a pair of second holes 22 in the second side 12 of the disk drive 10 is shown. As with the first shear connectors 5, the shear connectors 15 may be formed by deforming a portion of material from the second member 2 to form an appendage extending substantially perpendicular to the second member 2. The embodiments illustrated in FIGS. 3 and 5 do not have second shear connectors.

FIGS. 2–5 show various configurations for the first members 1, 1a, 1b, and 1c, the second member 2, the tab 7, and the shear connectors 5, 5a, and 15. The tab 7 and the shear connectors 5 and 15 may all be used to provide engagement with the disk drive 10 as shown in FIG. 2. FIGS. 3–5 show adequate combinations for engaging the disk drive as well. Many different combinations of these elements would also adequately engage a disk drive. In selecting an appropriate combination, at least one shear connector, either connector 5, 5a, or 15, must be used to prevent the disk drive 10 from sliding parallel to the first side 11 of the disk drive. Additionally, either a first shear connector 5, 5a, or the tab 7 may be used to prevent the second side 12 from moving away from the second member 2 along the first member 1. Other combinations of the shear connectors and tab not specifically illustrated are within the claims of the invention and are contemplated by the invention.

Deformable Member

Figure 6:
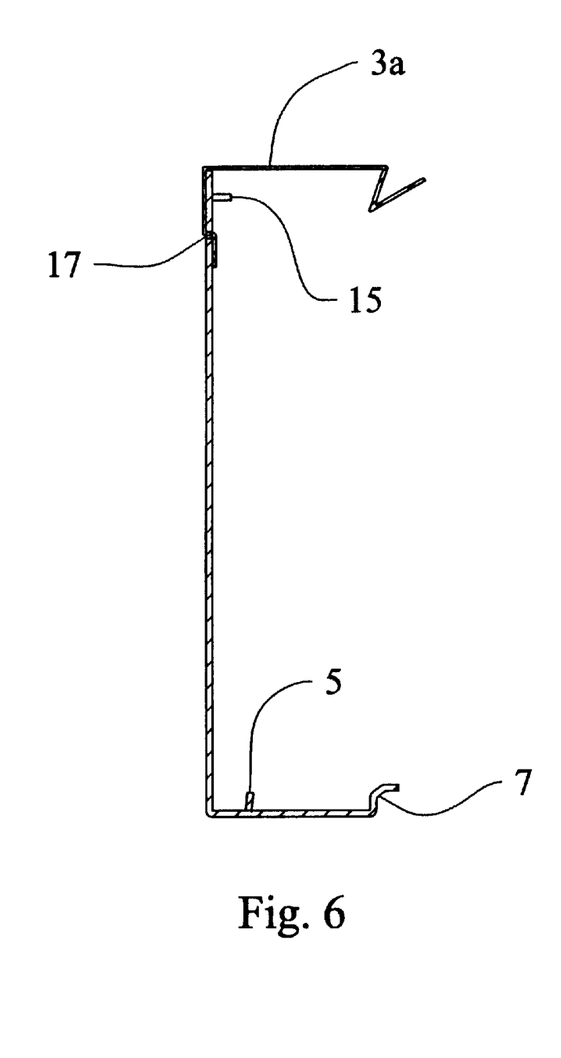
FIG. 6 is a cross section view of an embodiment of the apparatus with an alternate deformable member.

The deformable member 3 of the embodiments shown in FIGS. 3–5 is substantially identical to the deformable member 3 described above in association with FIG. 2. FIG. 6 shows a modified apparatus with an alternate deformable member 3a that can be inserted into an alternate slot 17 in a portion of the second member 2 that is parallel with the second side 12 of the disk drive when the disk drive 10 is installed. The alternate deformable member 3a requires less installation clearance for the modified apparatus. The embodiment shown has a first shear connector 5, a second shear connector 15, and a tab 7. Other shear connector and tab combinations as described above would also be adequate.

Figure 7:
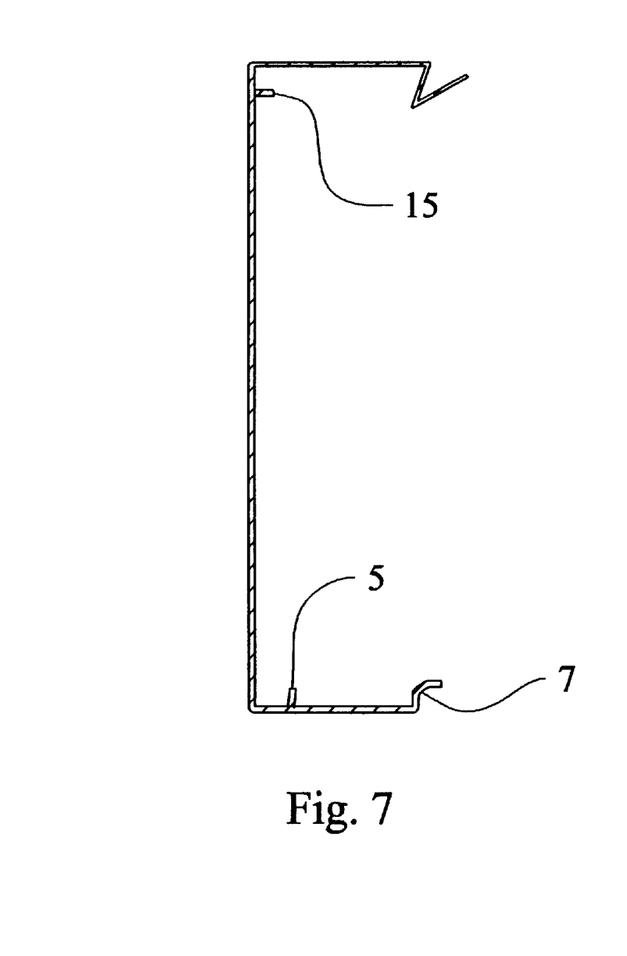
FIG. 7 is a cross section view of an embodiment of the apparatus formed from a single piece of material.

FIG. 7 illustrates an embodiment of the apparatus where a first member, a second member, and a deformable member are formed from a single piece of material. The embodiment shown has a first shear connector 5, a second shear connector 15, and a tab 7. Other shear connector and tab combinations as described above would also be adequate. This embodiment provides space savings as well as possible manufacturing savings since a single piece of material is used to fabricate an apparatus.

Description of Still Another Embodiment of the Invention

Figure 9:
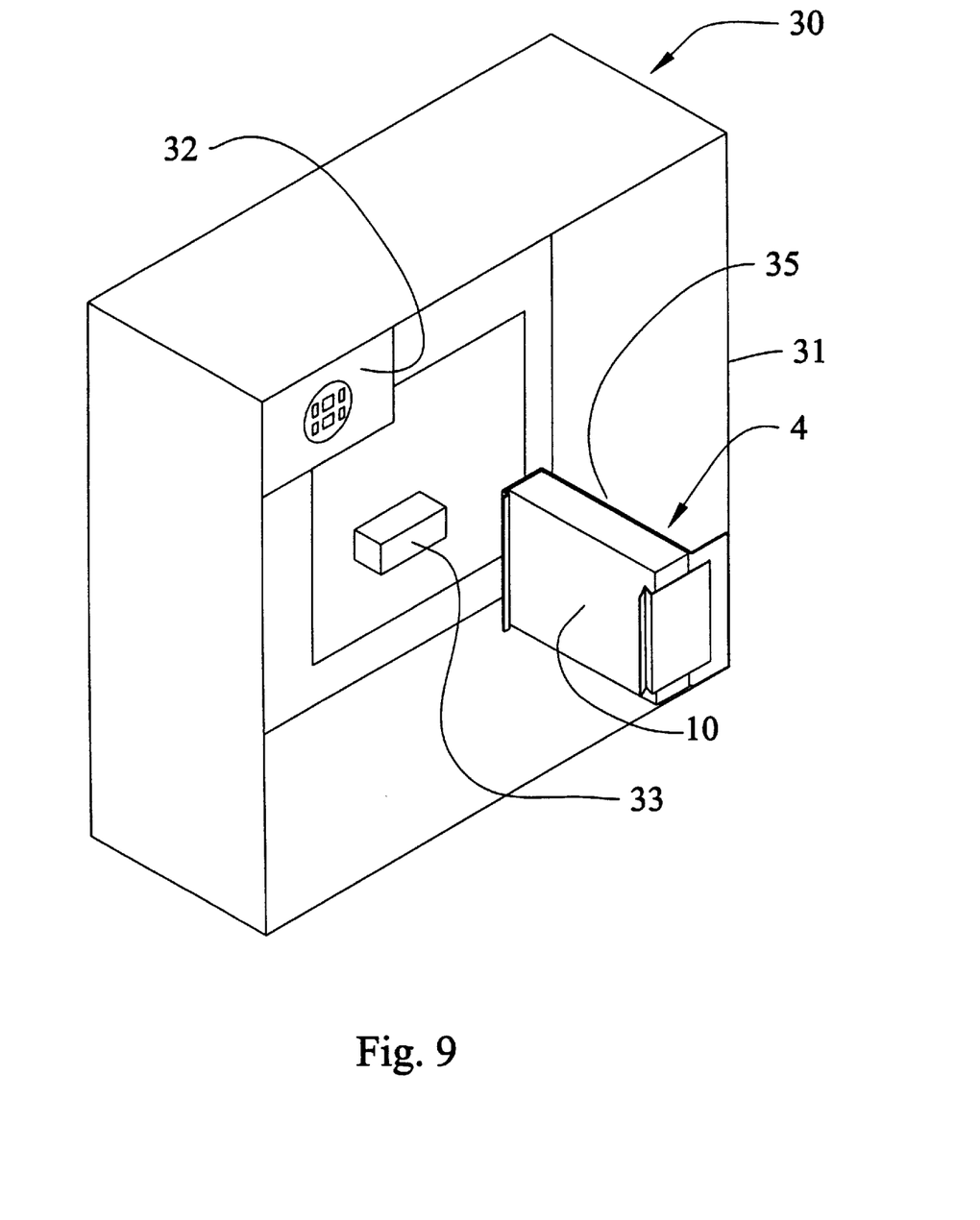
FIG. 9 is a top perspective view of a computer system including an embodiment of the apparatus.

FIG. 9 shows a computer system 30 having an apparatus for mounting a disk drive 4. Additionally, the computer system 30 has a chassis 31 with a power supply 32 coupled to the chassis. A central processing unit 33 is coupled to the chassis 31 and electrically connected to the power supply 32. The disk drive 10 is electrically connected to the central processing unit 33. The disk drive 10 is mounted to the chassis 31 with an apparatus for mounting a disk drive 4 similar to the apparatus described in detail above.

The chassis shown is the chassis for a tower or mini-tower computer. However, the invention is not limited to a computer of either of these types. The invention would be well-suited for application with any computer chassis.

The power supply and central processing units are elements known to those skilled in the art. Any operable model of either device is within the scope of the claims and would be sufficient for use with the invention.

FIG. 9 also shows a space 35 between the apparatus 4 and the chassis 31. The space 35 is advantageous in some embodiments because it provides for enhanced airflow and cooling for the disk drive 10.

Figure 10:
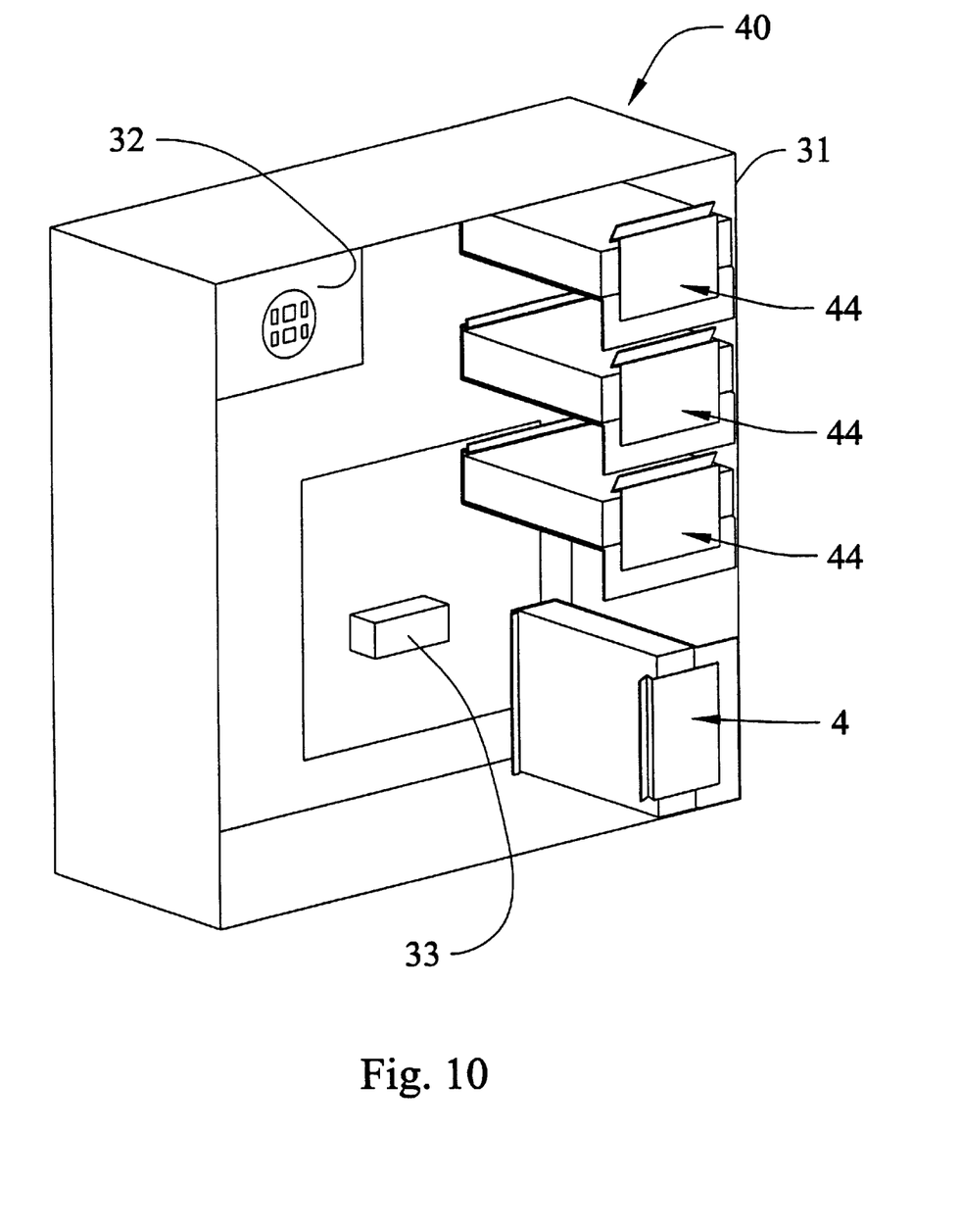
FIG. 10 is a top perspective view of a computer system employing various embodiments of the apparatus.

An alternate computer system 40 is shown in FIG. 10. The alternate computer system 40 has the components equivalent with the computer system 30 shown in FIG. 9. However, FIG. 10 shows additional apparatuses 44 employed to mount additional disk drives. The disk drives shown are mounted in locations where removable media disk drives are typically mounted. Examples of removable media disk drives that are ordinarily located in these locations include floppy disk drives and CD-ROM disk drives.

From the foregoing it will be appreciated that, although specific embodiments of the invention have been described herein for purposes of illustration, various modifications may be made without deviating from the spirit and scope of the invention. Accordingly, the invention is not limited except as by the claims.

Advantages of the Invention

Embodiments of the present invention are advantageous because they provide an apparatus and method that simplifies the connection of disk drives to a chassis. The apparatus and method provide for quick and efficient engagement and disengagement of disk drives without the use of threaded fasteners or tools.

Another advantage of the invention is that embodiments of the invention use few or even a single piece of material. Thereby the manufacturing complexity of the apparatus is reduced and the possibility of misplacing multiple components of the apparatus during manufacturing and maintenance is eliminated.

The apparatus is also advantageous because the chassis cover acts to secure a disk drive into the apparatus. The cover serves this function without having to be mated to the apparatus in any exacting manner. Therefore, manufacturing tolerances are increased with the invention.

What is claimed is:

1. An apparatus for mounting a disk drive, the disk drive having a first side, a second side, a third side, and a fourth side, the first side being opposite the third side and the second side being opposite the fourth side, the first side having a first hole and the second side having a second hole, the apparatus comprising:

a first member having a first shear connector for engaging the first hole;

a second member, coupled to said first member; and a deformable member with surfaces to engage the third and fourth sides of the disk drive, said deformable member coupled to said second member.

2. The apparatus of claim 1 wherein the first shear connector is formed by deforming a portion of material from said first member to form an appendage extending substantially perpendicular to said first member.

3. The apparatus of claim 1 wherein said second member and said first member are formed from a single piece of material.

4. The apparatus of claim 3 wherein said second member has one bend such that said second member is "L" shaped and the single piece formed with said first member is "S" shaped.

5. The apparatus of claim 1 wherein said second member has a second shear connector for engaging the second hole.

6. The apparatus of claim 5 wherein the second shear connector is formed by deforming a portion of material from said second member to form an appendage extending substantially perpendicular to said second member.

7. An apparatus for mounting a disk drive, the disk drive having a first side, a second side, a third side, and a fourth side, the first side being opposite the third side and the second side being opposite the fourth side, the first side having a first hole and the second side having a second hole, the apparatus comprising:

a first member having a first shear connector for engaging the first hole;

a second member, coupled to said first member; and a deformable member, coupled to said second member, for engaging the third and fourth sides of the disk drive;

wherein said second member has a slot for accepting a portion of said deformable member.

8. The apparatus of claim 7 wherein said deformable member has a bend that enables said deformable member to be inserted into a slot in a portion of said second member, the portion of said second member being parallel with the second side of the disk drive when the disk drive is installed.

9. The apparatus of claim 7 wherein said deformable member is inserted into a slot in a portion of said second member that is perpendicular to the second side of the disk drive when the disk drive is installed.

10. An apparatus for mounting a disk drive, the disk drive having a first side, a second side, a third side, and a fourth side, the first side being opposite the third side and the second side being opposite the fourth side, the first side having a first hole and the second side having a second hole, the apparatus comprising:

a first member having a first shear connector for engaging the first hole;

a second member, coupled to said first member; and a deformable member, coupled to said second member, for engaging the third and fourth sides of the disk drive;

wherein said first member, said second member, and said deformable member are formed from a single piece of material.

11. An apparatus for mounting a disk drive, the disk drive having a first side, a second side, a third side, and a fourth side, the first side being opposite the third side and the second side being opposite the fourth side, the first side having a first hole and the second side having a second hole, the apparatus comprising:

a first member for engaging the first and fourth sides of the disk drive;

a second member, coupled to said first member; and a deformable member, in addition to said first member, coupled to said second member, for engaging the third and fourth sides of the disk drive.

12. The apparatus of claim 11 wherein said first member and said second member are formed from a single piece of material.

13. The apparatus of claim 12 wherein said second member has one bend such that said second member is "L" shaped and the single piece formed with said first member is "S" shaped.

14. The apparatus of claim 11 wherein said second member has a second shear connector for engaging the second hole.

15. The apparatus of claim 14 wherein the second shear connector is formed by deforming a portion of material from said second member to form an appendage extending substantially perpendicular to said second member.

16. The apparatus of claim 11 wherein said first member, said second member, and said deformable member are formed from a single piece of material.

17. An apparatus for mounting a disk drive, the disk drive having a first side, a second side, a third side, and a fourth side, the first side being opposite the third side and the second side being opposite the fourth side, the first side having a first hole and the second side having a second hole, the apparatus comprising.

a first member for engaging the first and fourth sides of the disk drive;

a second member, coupled to said first member; and a deformable member , coupled to said second member, for engaging the third and fourth sides of the disk drive;

wherein said second member has a slot for accepting a portion of said deformable member.

18. The apparatus of claim 17 wherein said deformable member has a bend that enables said deformable member to be inserted into a slot in a portion of said second member that is parallel with the second side of the disk drive when the disk drive is installed.

19. The apparatus of claim 17 wherein said deformable member is inserted into a slot in a portion of said second member, the portion of said second member being perpendicular to the second side of the disk drive when the disk drive is installed.

20. An apparatus for mounting a disk drive, the disk drive having a first side, a second side, a third side, and a fourth side, the first side being opposite the third side and the second side being opposite the fourth side, the first side having a first hole and the second side having a second hole, the apparatus comprising:

a first member for engaging the first and fourth sides of the disk drive;

a second member, coupled to said first member; and a deformable member, coupled to said second member, for engaging the third and fourth sides of the disk drive;

wherein said first member has a first shear connector for engaging the first hole.

21. The apparatus of claim 20 wherein the first shear connector is formed by deforming a portion of material from said first member to form an appendage extending substantially perpendicular to said first member.

22. An apparatus for mounting a disk drive, the disk drive having a first side, a second side, a third side, and a fourth side, the first side being opposite the third side and the second side being opposite the fourth side, the first side having a first hole and the second side having a second hole, the apparatus comprising:

a first member for engaging the first and fourth sides of the disk drive;

a second member, coupled to said first member; and a deformable member, coupled to said second member, for engaging the third and fourth sides of the disk drive;

wherein said first member includes a leaf spring on which a first shear connector is mounted, the leaf spring for biasing the disk drive away from said first member.

23. An apparatus for mounting a disk drive, the disk drive having a first side, a second side, a third side, and a fourth side, the first side being opposite the third side and the second side being opposite the fourth side, the first side having a first hole and the second side having a second hole, the apparatus comprising:

a first member for engaging the first and fourth sides of the disk drive;

a second member, coupled to said first member; and a deformable member, coupled to said second member, for engaging the third and fourth sides of the disk drive;

wherein said first member includes a leaf spring that contacts the first side of the disk drive for biasing the disk drive away from said first member.

24. A computer system having an apparatus for mounting a disk drive, the disk drive having a first side, a second side, a third side, and a fourth side, the first side being opposite the third side and the second side being opposite the fourth side, the first side having a first hole and the second side having a second hole, the system comprising:

a chassis;

a power supply coupled to said chassis;

a central processing unit coupled to said chassis and electrically connected to said power supply; and a disk drive electrically connected to said central processing unit having an apparatus for mounting a disk drive to said chassis, the apparatus comprising:

a first member for engaging the first side of the disk drive, a second member, coupled to said first member, and a deformable member, in addition to said first member, coupled to said second member, for engaging the third and fourth sides of the disk drive.

25. A method of installing a disk drive comprising the acts of:

positioning at least a portion of a first side of the disk drive onto a first member of an apparatus for mounting a disk drive;

rotating the disk drive toward the apparatus about a point near the first member; and displacing a deformable member with a portion of the disk drive until the disk drive is captured within the confines of the deformable member and within the apparatus.

26. The method of claim 25 wherein the act of positioning a first side of the disk drive includes the act of placing a corner of the disk drive formed in part by the first side of the disk drive onto the first member.

27. The method of claim 25 wherein the act of positioning a first side of the disk drive includes the act of engaging a first hole in the first side with a first shear connector in the first member of the apparatus.

28. The method of claim 25 wherein the act of rotating the disk drive includes the act of rotating the disk drive about a corner of the disk drive, the corner of the disk drive being formed in part by the first side of the disk drive.

29. The method of claim 25 further comprising the act of placing a chassis cover on the chassis to abut with a portion of the apparatus for mounting a disk drive to prevent the disk drive from dislodging from the apparatus.

30. An apparatus for mounting a disk drive, the disk drive having a first side, a second side, a third side, and a fourth side, the first side being opposite the third side and the second side being opposite the fourth side, the first side having a first hole and the second side having a second hole, the apparatus comprising:

a first member having a first shear connector for engaging the first hole;

a second member, coupled to said first member; and a deformable member, coupled to said second member, for engaging the third and fourth sides of the disk drive;

wherein said first member includes a leaf spring on which the first shear connector is mounted, the leaf spring for biasing the disk drive away from said first member.

* * * * *